United States Patent Office

2,918,404
SOLID COMPRESSED AMINO ACID SPERMICIDAL VEHICLE

William C. Mende, Neshanic, and John L. Seidel, North Plainfield, N.J., assignors to Ortho Pharmaceutical Corporation, a corporation of New Jersey No Drawing. Application July 30, 1956
Serial No. 600,666

17 Claims. (Cl. 167—58)

This invention relates to pharmaceutical vehicles which disintegrate rapidly when introduced intravaginally, and is a continuation-in-part of our application Serial No. 524,262, filed July 25, 1955, now abandoned. More particularly, this invention relates to dry, solid, pharmaceutical vehicles, such as tablets, pellets, and the like, which disintegrate within a short period of time after insertion intravaginally to promptly release a therapeutic, medicinal, or other pharmacologically active material incorporated therein.

Solid or semi-solid pharmaceutical vehicles which dissolve or disintegrate under the influence of body heat and fluids have been formulated heretofore. Generally, these vehicles have been formulated to dissolve or disintegrate over extended periods of time so that the ingredient incorporated therein will be released slowly to exercise its properties by degrees to give a prolonged effect. Glycerin and gelatin suppositories are well-known examples of semi-solid vehicles of this type and usually require exposure of about thirty minutes or more at body temperatures to melt. Other such vehicles have been formulated to dissolve or disintegrate over longer periods of time.

For certain purposes, however, it is especially desirable to provide a pharmaceutical vehicle in dry, solid, compressed form which will disintegrate rapidly after introduction intravaginally so that the ingredient incorporated in the vehicle will be released quickly to exercise its function shortly after introduction. Vehicles of this type have particular application in the field of contraception and for certain therapeutic treatments where it is necessary to obtain prompt application of the ingredient incorporated in the vehicle to the desired body area. Earlier attempts to provide such vehicles usually employed various agents, such as a combination of an acid and sodium bicarbonate, which would effervesce or foam upon contact with body fluids to effect disintegration of the vehicle. The rate of disintegration of these vehicles was too slow principally because of the formation of a film or blanket on the exterior of the vehicle which retarded penetration of vaginal fluids into the interior of the vehicle to effect complete and rapid disintegration. For example, a combination of sodium bicarbonate and an acid did not produce effective, rapid disintegration because the carbon dioxide foam which was formed blanketed the exterior surface of the vehicle and acted as a barrier between body fluids and the interior of the vehicle. In addition, vehicles of this type were unsatisfactory because they had poor storage properties and often broke when shipped.

We have discovered that a dry, solid, compressed pharmaceutical vehicle which disintegrates rapidly when introduced intravaginally may be obtained by providing a vehicle of urea, a "wicking agent" as defined below, and a compound present in sufficient quantities to be nontoxic and nonirritating and to provide the vehicle with an acid pH. By rapid disintegration, we refer to disintegration within a period of about five minutes after the vehicle is introduced intravaginally, and contacts about one cubic centimeter of vaginal fluid.

The vehicle of our invention has numerous applications where it is necessary and desirable to provide prompt and effective application of an incorporated ingredient or compound intravaginally. Within a short time after introduction intravaginally, the vehicle of our invention disintegrates and promptly releases the ingredient incorporated therein. While not limited thereto, the vehicle of our invention is particularly suitable as a carrier for spermicidal agents.

Because it is very soluble in water, urea alone, in dry, compressed form, would appear to be suitable as a vehicle which would disintegrate rapidly when introduced intravaginally. However, tests conducted on such vehicles made of urea alone revealed that rapid disintegration did not occur. The urea merely dissolved slowly over an extended period of time. Dissolution of the urea occurred on the surface of the vehicle in direct contact with vaginal fluid and proceeded inwardly towards the interior as the urea on the surface dissolved. It was then considered that more rapid disintegration would be obtained by combining with urea a material which would conduct the vaginal fluid by physical or other means into the interior of the vehicle. For example, it was considered that by combining certain fibers, such as cellulosic fibers, with urea, the vaginal fluid at the surface of the vehicle would be absorbed by the fibers and conducted into the interior of the vehicle by capillary action or some similar action. When clinical tests were conducted on such vehicles, it was found that, during certain stages in the female ovulatory cycle, gelatinization of vaginal fluid occurred. This was apparently brought about by coaction between the urea and vaginal fluid. Gelatinization of the fluid occurred before and after the time of ovulation and resulted in the formation of a film on the exterior of the vehicle which acted as a barrier to penetration of vaginal fluid into the interior. Therefore, during these stages in the ovulatory cycle, a vehicle of this type would be unacceptable as a rapidly disintegrating vehicle, particularly for contraceptive purposes. Whereupon, we then discovered that by incorporating a substance which would impart acidity to the vehicle, rapid disintegration could be obtained.

The vehicle of our invention comprises, in general, a dry, solid amino acid or a mixture of amino acids in compressed form, with about 1 percent to about 30 percent of a wicking agent which conducts vaginal fluid into the interior of the vehicle. In addition to the amino acid or mixture of amino acids, another compound may be present in sufficient quantities to be nontoxic and nonirritating under conditions of use and to provide the vehicle with an acid pH, preferably from about 3.5 to about 6.5. The amino acids may, of course, be present in the form of their salts.

Our invention may be more fully understood by considering the following examples which are for illustrative purposes only. The may obviously be modified without departing from our invention and we, therefore, do not intend to limit our invention to the specific embodiments set forth. All parts are given by weight.

Example I

| | Percent |
|---|---|
| Adipic acid | 1.0 |
| Carboxymethyl cellulose acid, 40–100 mesh | 1.0 |
| Glycine | 98.0 |

Example II

| | |
|---|---|
| Succinic acid | 10.0 |
| Rayon, 100–200 mesh | 10.0 |
| Glutamic acid | 80.0 |

Example III

| | |
|---|---|
| Pyruvic acid | 0.5 |
| Wool, 200–325 mesh | 0.5 |
| Arginine hydrochloride | 99.0 |

Example IV

| | |
|---|---|
| Glycolic acid | 2.5 |
| Silk, 40–100 mesh | 20.0 |
| Serine | 77.5 |

Example V

| | |
|---|---|
| Urea | 5.0 |
| Cotton, 100–200 mesh | 8.0 |
| Cysteine hydrochloride | 87.0 |

Example VI

| | |
|---|---|
| Boric acid | 5.0 |
| Silk, 200–325 mesh | 6.0 |
| Cystine hydrochloride | 89.0 |

Example VII

| | |
|---|---|
| Urea hydrochloride | 7.0 |
| Rayon, 40–100 mesh | 4.0 |
| Lysine hydrochloride | 89.0 |

Example VIII

| | |
|---|---|
| Glycerophosphoric acid, 25% | 1.5 |
| Aluminum carboxymethyl cellulose, 100–200 mesh | 5.0 |
| Valine hydrochloride | 93.5 |

Example IX

| | |
|---|---|
| Citric acid | 1.0 |
| Oxycellulose, 200–325 mesh | 3.0 |
| β-Alanine | 96.0 |

Example X

| | |
|---|---|
| Ascorbic acid | 1.0 |
| Carboxymethyl cellulose acid, 100–200 mesh | 2.0 |
| Proline hydrochloride | 97.0 |

Example XI

| | |
|---|---|
| Phenylacetic acid | 1.0 |
| Wool, 40–100 mesh | 7.0 |
| Leucine hydrochloride | 92.0 |

Example XII

| | |
|---|---|
| Glutamic acid | 1.0 |
| Calcium alginate, 100–200 mesh | 15.0 |
| Glycine | 84.0 |

Example XIII

| | |
|---|---|
| Sorbic acid | 2.0 |
| Cotton, 200–325 mesh | 12.0 |
| Tyrosine hydrochloride | 86.0 |

Example XIV

| | |
|---|---|
| Adipic acid | 2.5 |
| Carboxymethyl cellulose acid, 100–200 mesh | 1.5 |
| Phenyl alanine hydrochloride | 96.0 |

Example XV

| | |
|---|---|
| Adipic acid | 2.5 |
| Carboxymethyl cellulose acid, 100–200 mesh | 2.0 |
| Aluminum carboxymethyl cellulose, 100–200 mesh | 5.0 |
| Tryptophane hydrochloride | 90.5 |

Example XVI

| | |
|---|---|
| Aluminum carboxymethyl cellulose, 100–200 mesh | 30.0 |
| Adipic acid | 2.5 |
| Methionine hydrochloride | 67.5 |

Example XVII

| | |
|---|---|
| Calcium polygalacturonate, 40–100 mesh | 5.0 |
| Adipic acid | 2.5 |
| Threonine hydrochloride | 92.5 |

Example XVIII

| | |
|---|---|
| Aluminum polygalacturonate, 40–100 mesh | 20.0 |
| Urea | 2.5 |
| Taurine | 77.5 |

One method of making the vehicle of this invention is as follows: The amino acid or mixture of amino acids and the compound which imparts acidity to the vehicle, if required, are mixed until uniform in a helical or other suitable mixer. The mixture is then compressed into slugs one inch in diameter on a tabletting machine. The compressed slugs are ground in a comminuting machine to the desired fineness, the resulting granulation dried for sixteen hours at 50° C. and then mixed with the wicking agent and the material to be incorporated therein, e.g., a therapeutic, contraceptive, or other pharmacologically active ingredient, in a helical or other suitable mixer until uniform. The granulation is compressed to the desired shape and hardness on a tabletting machine.

The wicking agent, as we have designated the material which conducts the vaginal fluid by capillary action or otherwise into the interior of the vehicle, should be water insoluble and capable of absorbing about six percent moisture at 65 percent relative humidity and 70° F. Materials tested and found suitable may be fibrous of nonfibrous and include cellulosic, proteinaceous and synthetic fibers, such as absorbent cotton, wood cellulose, oxycellulose, silk, rayon, wool and carboxymethyl cellulose acid. Examples of suitable nonfibrous materials which are water insoluble and which absorb the amount of moisture noted above include the aluminum and calcium salts of alginic acid, pectic acid and polygalacturonic acid.

The wicking agent may be present in the vehicle in different proportions, for example, from about 0.5 percent to about 30 percent, and in different fiber or particle sizes, including on the average of from about 30 mesh to about 325 mesh. In addition, different combinations of wicking agents and mesh sizes may be employed. A combination of carboxymethyl cellulose acid and the aluminum salt of carboxymethyl cellulose acid is particularly suitable because relatively hard vehicles may be made from this combination.

The compounds incorporated in the vehicle to impart acidity should be nontoxic and nonirritating under conditions of use. To prevent gelatinization of vaginal fluid which inhibits penetration of the fluid into the interior of the vehicle to effect disintegration, an acidic compound may be present in sufficient amounts to provide the vehicle with a pH of from about 3.5 to about 6.5, preferably about 4.0. To determine the pH of the vehicle, two grams of the vehicle are mixed with two grams of distilled water and the pH measured on a Beckman pH meter at 70° F. using a glass electrode. Acid compounds which have been found satisfactory include boric, succinic, malonic, glutaric, pimelic, tricarballylic, sorbic, maleic, fumaric, citraconic, glycolic, tartaric, adipic, malic, mucic, citric, pyruvic, levulinic, glycine, phenylacetic, phenylsuccinic, mandelic, cinnamic, serine, sulphanilic, glycerophosphoric, ascorbic and uric. Certain ordinarily classified toxic and irritating acidic compounds may be used to provide the desired pH, provided the quantities used are nonirritating and nontoxic under conditions of use. An example is hydrochloric acid. Other acidic compounds, such as urea hydrochloride, biuret hydrochloride, and monosodium phosphate, have been found satisfactory.

Specific vehicles of this invention were formulated to include an ingredient having spermicidal properties for use as a contraceptive. Two illustrative examples are set forth below. All parts are given by weight.

Example XIX

| | Percent |
|---|---|
| Glycine | 90.0 |
| Urea | 5.0 |
| Carboxymethyl cellulose acid | 2.0 |
| Adipic acid | 2.5 |
| Phenyl-p-quinone | 0.5 |

Example XX

| | |
|---|---|
| Glycine | 93.5 |
| Carboxymethyl cellulose acid | 2.5 |
| Adipic acid | 2.0 |
| Nonylphenoxypolyethoxyethanol | 2.0 |

The quantities of each component in the above illustrative examples are preferably present in the following proportions: glycine, from about 65 to about 98.5 percent; carboxymethyl cellulose, from about 0.5 to about 4.0 percent; adipic acid, from about 1 to about 3 percent; and nonylphenoxypolyethoxyethanol, from about 0.15 to about 2 percent.

For ease of insertion intravaginally, the vehicle is preferably made in the form of a long, flat tablet with rounded ends and weighing approximately 2 grams. The hardness to which the vehicle may be compressed may vary and we have found that vehicles compressed on a single punch tablet machine produce suitable vehicles when compressed to a hardness of from about 5 to about 12 kilograms measured on the apparatus and in accordance with the method disclosed in U.S. Patent No. 2,041,869. Softer vehicles which have a hardness below 5 kilograms disintegrate with sufficient speed, but require gentle handling in use and when shipped. Preferably the vehicle is compressed to a hardness of about 7 kilograms when made on a single punch tablet machine.

Laboratory and clinical studies on the vehicle of this invention indicated no untoward reactions, side effects, toxicity or irritation.

It is apparent that variations, substitutions and modifications may be made from the foregoing illustrations without departing from the spirit and scope of this invention.

What is claimed is:

1. A dry, solid, compressed, pharmaceutical vehicle which disintegrates rapidly when introduced intravaginally and will dissolve in water to give an acid pH comprising, in combination, at least one amino acid, the total weight of amino acids present in said vehicle amounting to about 65 to about 99.5 percent and about 0.5 to about 30 percent of a water insoluble wicking agent capable of absorbing about 6 percent moisture at 65 percent relative humidity and 70° F.

2. A pharmaceutical vehicle according to claim 1 containing a spermicidal agent.

3. A pharmaceutical vehicle according to claim 2, in which the spermicidal agent is nonylphenoxypolyethoxyethanol.

4. A dry, solid, compressed, pharmaceutical vehicle which disintegrates rapidly when introduced intravaginally and will dissolve in water to give an acid pH comprising, in combination, at least one amino acid, the total weight of amino acids present in said vehicle amounting to about 65 to about 99.4 percent and about 0.5 to about 30 percent of a water insoluble wicking agent capable of absorbing at least about 6 percent moisture at 65 percent relative humidity and 70° F., and about 0.1 to about 5 percent of a nontoxic, nonirritating acidic compound.

5. A dry, solid, compressed, pharmaceutical vehicle which disintegrates rapidly when introduced intravaginally and will dissolve in water to give an acid pH comprising, in combination, about 65 to about 99.5 percent glutamic acid, and about 0.5 to about 30 percent of a water insoluble wicking agent capable of absorbing about 6 percent moisture at 65 percent relative humidity and 70° F.

6. A dry, solid, compressed, pharmaceutical vehicle which disintegrates rapidly when introduced intravaginally comprising, in combination, about 65 to about 99 percent glutamic acid, about 0.5 to about 30 percent of a water insoluble wicking agent capable of absorbing about 6 percent moisture at 65 percent relative humidity and 70° F., and an acidic compound present in amounts sufficient to be nontoxic and nonirritating and to provide the vehicle with a pH of from about 3.5 to about 6.5.

7. A dry, solid, compressed, pharmaceutical vehicle which disintegrates rapidly when introduced intravaginally comprising, in combination, about 65 to about 99.5 percent by weight glycine, about 0.5 to about 30 percent of a water insoluble wicking agent capable of absorbing about 6 percent moisture at 65 percent relative humidity and 70° F.

8. A dry, solid, compressed, pharmaceutical vehicle which disintegrates rapidly when introduced intravaginally comprising, in combination, about 65 to about 99.4 percent glycine, about 0.5 to about 30 percent of a water insoluble wicking agent capable of absorbing about 6 percent moisture at 65 percent relative humidity and 70° F., and about 0.1 to about 5 percent of a solid, nontoxic, nonirritating acidic compound, said vehicle having a hardness of about 5 to about 12 kilograms.

9. A dry, solid, compressed, pharmaceutical vehicle which disintegrates rapidly when introduced intravaginally comprising, in combination, about 65 to about 99.4 percent by weight glycine, about 0.5 to about 30 percent of a water insoluble fibrous wicking agent capable of absorbing about 6 percent moisture at 65 percent relative humidity and 70° F., and about 0.1 to about 5 percent of a nontoxic, nonirritating acidic compound.

10. A dry, solid, compressed, pharmaceutical vehicle which disintegrates rapidly when introduced intravaginally comprising, in combination, about 65 to about 99 percent by weight valine, about 0.5 to about 30 percent of a water insoluble, cellulosic wicking agent capable of absorbing about 6 percent moisture at 65 relative humidity and 70° F., and an acidic compound present in amounts sufficient to be nontoxic and nonirritating and to provide the vehicle with an acid pH.

11. A dry, solid, compressed, pharmaceutical vehicle which disintegrates rapidly when introduced intravaginally comprising, in combination, about 65 to about 99.4 percent by weight glycine, about 0.5 to about 30 percent of a water insoluble, proteinaceous wicking agent capable of absorbing about 6 percent moisture at 65 percent relative humidity and 70° F., and an acidic compound present in amounts sufficient to be nontoxic and nonirritating and to provide the vehicle with an acid pH.

12. A dry, solid, compressed, pharmaceutical vehicle which disintegrates rapidly when introduced intravaginally comprising, in combination, about 65 to about 99 percent by weight glycine, about 0.5 to about 30 percent of a water insoluble wicking agent capable of absorbing about 6 percent moisture at 65 percent relative humidity and 70° F., and being from about 30 to about 325 mesh, and an acidic compound present in amounts sufficient to be nontoxic and nonirritating and to provide the vehicle with a pH of from about 3.5 to about 6.5.

13. A dry, solid, compressed, pharmaceutical vehicle which disintegrates rapidly when introduced intravaginally comprising, in combination, about 65 to about 99 percent by weight glycine, about 0.5 to about 30 percent of a water insoluble wicking agent capable of absorbing about 6 percent moisture at 65 percent relative humidity and 70° F., and an acidic compound present in amounts sufficient to be nontoxic and nonirritating and to provide the vehicle with a pH of from about 3.5 to about 6.5, said vehicle having a hardness of from about 5 to about 12 kilograms.

14. A dry, solid, compressed, pharmaceutical vehicle which disintegrates rapidly when introduced intravaginally comprising, in combination, about 63 to about 97 percent glycine, about 0.5 to about 4 percent carboxymethyl cellulose acid, about 1 to about 30 percent aluminum carboxymethyl cellulose and about 1 to about 5 percent adipic acid, said vehicle having a hardness of from about 5 to about 12 kilograms.

15. A dry, solid, compressed, pharmaceutical vehicle which disintegrates rapidly when introduced intravaginally comprising, in combination, about 65 to about 99 percent by weight glycine, about 0.5 to about 30 percent of a water insoluble wicking agent capable of absorbing about 6 percent moisture at 65 percent relative humidity and 70° F., an acidic compound present in amounts sufficient to be nontoxic and nonirritating and to provide the vehicle with a pH of from about 3.5 to about 6.5, and a spermidical agent.

16. A dry, solid, compressed, pharmaceutical vehicle which disintegrates rapidly when introduced intravaginally comprising, in combination, about 65 to about 99 percent glycine, about 0.5 to about 30 percent of a water insoluble wicking agent capable of absorbing about 6 percent moisture at 65 percent relative humidity and 70° F., an acidic compound present in amounts sufficient to be nontoxic and nonirritating and to provide the vehicle with an acid pH, and phenyl-p-quinone.

17. A dry, solid, compressed, pharmaceutical vehicle which disintegrates rapidly when introduced intravaginally and will dissolve in water to give an acid pH comprising, in combination, about 65% to about 97% glycine and about 1% to about 4% carboxymethylcellulose acid and about 2% nonylphenoxypolyethoxyethanol.

References Cited in the file of this patent

UNITED STATES PATENTS

| | | |
|---|---|---|
| 2,219,535 | Schmidt | Oct. 29, 1940 |
| 2,467,884 | Elias | Apr. 19, 1949 |
| 2,484,637 | Mattocks | Oct. 11, 1949 |
| 2,602,042 | Abbott | July 1, 1952 |

FOREIGN PATENTS

| | | |
|---|---|---|
| 387,596 | Germany | Dec. 29, 1923 |
| 487,258 | Great Britain | June 17, 1938 |
| 150,013 | Australia | Feb. 12, 1953 |
| 714,870 | Germany | Dec. 9, 1941 |

OTHER REFERENCES

Baker: J. of Hygiene, April 1932, pp. 171–183, esp. pp. 179–180.

Hirschfeld et al.: Arch. of Otolaryngology, December 1946, vol. 44, pp. 686–700, esp. 687.

Zernick: Manuf. Chem., July 1939, vol. 10, pp. 241–2.

New and Nonofficial Remedies, 1954, J. B. Lippincott Co., Philadelphia, pp. XXXIV–XXXV.

UNITED STATES PATENT OFFICE
CERTIFICATE OF CORRECTION

Patent No. 2,918,404                                                                   December 22, 1959

William C. Mende et al.

It is hereby certified that error appears in the printed specification of the above numbered patent requiring correction and that the said Letters Patent should read as corrected below.

Column 6, line 44, for "about 99.4" read -- about 99 --.

Signed and sealed this 7th day of June 1960.

(SEAL)
Attest:

KARL H. AXLINE                                                  ROBERT C. WATSON
Attesting Officer                                               Commissioner of Patents